United States Patent [19]

Tsutsui et al.

[11] Patent Number: 4,652,218

[45] Date of Patent: * Mar. 24, 1987

[54] CANNED MOTOR PUMP FOR USE AT HIGH TEMPERATURES

[75] Inventors: Toshiaki Tsutsui; Hiroshi Ohki, both of Tokyo, Japan

[73] Assignee: Nikkiso Co., Ltd., Tokyo, Japan

[ * ] Notice: The portion of the term of this patent subsequent to Dec. 31, 2002 has been disclaimed.

[21] Appl. No.: 805,876

[22] Filed: Dec. 6, 1985

Related U.S. Application Data

[63] Continuation-in-part of Ser. No. 646,040, Aug. 30, 1984, abandoned, which is a continuation of Ser. No. 313,766, Oct. 22, 1981, abandoned.

[30] Foreign Application Priority Data

Jan. 16, 1981 [JP] Japan .................................. 56-3780
Aug. 20, 1981 [JP] Japan ................................ 56-129330

[51] Int. Cl.$^4$ ..................... F04B 17/00; F04B 35/00; F04B 39/02; F04B 39/06
[52] U.S. Cl. ................................. 417/368; 417/370; 310/208; 501/151
[58] Field of Search ............... 417/368, 370, 369, 366, 417/371, 372; 310/43, 87, 208, 214, 215; 252/567; 428/324, 369, 370, 450; 106/DIG. 3, 287.1; 174/110 R, 110 S; 264/61; 501/151, 154

[56] References Cited

U.S. PATENT DOCUMENTS

| | | |
|---|---|---|
| 2,595,730 | 5/1952 | Swiss et al. .................... 106/DIG. 3 |
| 2,939,399 | 6/1960 | Rutschi .............................. 417/370 |
| 3,057,741 | 10/1962 | Moore ........................... 106/DIG. 3 |
| 3,220,349 | 11/1965 | White .................................. 417/370 |
| 3,777,198 | 12/1973 | Anderson et al. ..................... 310/43 |
| 3,852,137 | 12/1974 | Balke et al. ......................... 156/196 |
| 3,870,910 | 3/1975 | Füssner . |
| 4,045,241 | 8/1977 | Daimon et al. ............... 106/DIG. 3 |
| 4,212,914 | 7/1980 | Ponomareva ....................... 428/324 |
| 4,275,319 | 6/1981 | Davis . |

FOREIGN PATENT DOCUMENTS 1703433 12/1971 Fed. Rep. of Germany ...... 417/368
148997 11/1980 Japan .................................. 417/368

Primary Examiner—Carlton R. Croyle
Assistant Examiner—Donald E. Stout

[57] ABSTRACT

A canned motor pump is adapted for use at high temperatures and enables generated heat from the motor to be absorbed in a treating fluid or liquid upon circulation through the motor thereby conserving heat values in the treating fluid or liquid. The canned motor pump can circulate high temperature treating fluids, or liquids through the canned motor portion without damaging the coils of the motor because of a ceramic-like high temperature insulation used for the electrical field windings, which insulation is provided by mixing a silicone resin, synthetic fluoro-mica and a devitrified mica glass and impregnating the electrical winding coils with such material, whereafter the material is cured and then subjected to an elevated temperature above 300° C. to form the ceramic-like insulation.

13 Claims, 9 Drawing Figures

FIG. 5 Cured Impregnant, heated and cured for 15 hrs at 200°C

FIG. 6 Cured Impregnant, heated for 1000 hrs. at 40° C

CANNED MOTOR PUMP FOR USE AT HIGH TEMPERATURES

CROSS REFERENCES TO RELATED APPLICATIONS

This application is a continuation-in-part of our pending prior application, Ser. No. 646,040 filed Aug. 30, 1984, now abandoned, which application was in turn a continuation of application Ser. No. 313,766 filed Oct. 22, 1981 and now abandoned. This application also incorporates material from pending prior application Ser. No. 693,767, filed Jan. 23, 1985, which has been allowed by the Patent Office, now U.S. Pat. No. 4,562,164, and which is itself a continuation-in-part of application Ser. No. 512,908 filed July 11, 1983, and now abandoned. All of the above applications, as well as the current application, have been assigned to the same assignee.

FIELD OF THE INVENTION

This invention relates to a canned motor pump transporting a high temperature fluid or liquid, more particularly to a canned motor pump for use at high temperature in which heat generated from the motor can be absorbed in a treating fluid upon circulation through the canned motor at the high temperature for maintaining optimum operation of the motor, thereby permitting the heat load of a heating source to be alleviated when maintaining the fluid at processing temperatures.

BACKGROUND OF THE INVENTION

In general, a canned motor pump is cooled at its motor part and lubricated at its bearings by circulating a portion of the treating fluid through a rotor chamber of the canned motor. However, in a canned motor pump for treating a fluid of more than 200° C., the motor is obviously difficult to cool directly with fluid of such temperature, necessitating a separate cooling system, for example, a separate cooling water supply. For this reason, such type of canned motor has the disadvantage of a high initial cost because of the additional requirements for a separate cooling system in addition to the pumping system. Further, a conventional canned motor pump is unsatisfactory as regards conservation of natural resources or energy because of the heat loss due to cooling and additionally suffers from the disadvantage of entailing an extremely high fuel cost for a heating source for the high temperature fluid.

Now it has been found that the heat load for the treating source for the high temperature fluid may be significantly reduced by constructing a canned motor in a thermal resistant structure in which the canned motor is connected to the pump via an adapter, in which the thermal resistance of a bearing liquid seal is enhanced and in which heat values generated by the motor are absorbed into the circulating fluid.

While the improvement in the heat resistance of motor components is necessary for enhancing that of the canned motor itself, the dielectric strength of the winding at high temperature is especially important. The conventional canned motor, as generally constructed, has an insulation for insulating a set of windings, which thermally deteriorates in a high temperature environment of more than 200° C., leading to poor mechanical strength and damage to the windings.

In this respect, we have found that the mechanical and the dielectric strength of the winding may be increased by using, as the insulation for the winding, an insulation formed in such a way that synthetic fluorinated mica pieces together with an organic solvent are suspended in an organic silicone solvent and the resulting material is impregnated and cured. Such type of insulation will vaporize some fluorine compunds from the synthetic fluorinated mica in a high temperature environment of more than 200° C., and these compounds will react with siloxane derived from the organic silicone compound for ceramicization, thereby increasing the mechanical and dielectric strength of the winding.

Still further it has been found that the heat values from the motor may be absorbed in the treating fluid for maintaining the latter at the desired high temperatures above 200° C. by constructing the canned motor pump in such a way that the canned motor with enhanced heat resistance is connected to the pump through the intermediary of an adapter for thermally separating the motor. For cooling the motor a portion of the high temperature treating fluid is circulated into the canned motor partially through external piping in which the high temperature fluid is cooled in an ambient environment for providing a desired temperature reduction, the resulting temperature difference of the treating fluid enabling natural circulation of the fluid or, if desired, an auxiliary impeller may forcibly circulate the same into the canned motor. Thus, a canned motor pump for use at high temperature of simple construction may be obtained, which contributes to conservation of natural resources and energy, thereby significantly reducing operational costs.

SUMMARY OF THE INVENTION

A general object of the invention is to provide an economically superior canned motor pump for use at high temperature, in which the heat resistance of the canned motor is improved, the heat energy generated by the canned motor is absorbed in the treating fluid, the heat load for a heating source in a manufacturing plant for the high temperature fluid is reduced, and significant energy savings may be achieved.

A principal object of the invention is to provide a canned motor pump for use at high temperature, for treating a fluid of more than 200° C., which comprises a canned motor improved in dielectric strength at high temperature by impregnating a field winding with an insulating material of special silicone resin followed by curing, said silicone resin being filled with fluorinated mica, and having a circulating system for introducing a portion of the treating fluid into a rotor chamber of the canned motor through an external or internal conduit, and in which heat generated by the motor is absorbed in the treating fluid.

PREFERRED EMBODIMENTS OF THE INVENTION

In the canned motor pump according to the invention, the circulating system for the treating fluid may preferably comprise an external conduit derived from the delivery side of the pump, a rear rotor chamber communicating with the external conduit, and a front rotor chamber communicating with a pump chamber on the back side of an impeller.

Further, the pump and the canned motor may preferably be connected with an adapter having respective paths communicated therewith.

Alternatively, the circulating system for the treating fluid may comprise a front rotor chamber communicating with a peripheral portion of the impeller, and a rear rotor chamber communicating with the pump chamber on the back side of the impeller through an internal conduit arranged in a rotor shaft.

Alternatively, the circulating system for the treating fluid may comprise an auxiliary pump chamber defined between the pump chamber and the front rotor chamber, the auxiliary pump chamber communicating with the main pump on the back side of the impeller while the auxiliary pump chamber at its delivery side communicates with the rear rotor chamber through the external conduit and further the auxiliary pump chamber at its suction side communicates with the front rotor chamber.

A cooling fin may be attached to the external conduit for improving the effect of natural cooling.

Furthermore, the field winding is preferably formed by use of a winding made from a nickel-plated copper wire coated thereon with a glass insulating coat, secured by a wedge made from laminated mica bonded with an inorganic material, surrounded by a flexible insulating sheet made from laminated mica using the least possible amount of special silicone resin adhesive, and impregnated with an impregnating insulation material of special silicone resin filled with synthetic fluorinated mica. In this case, the impregnating material is a suspension of synthetic fluorinated mica pieces with an organic solvent in an organic silicone compound solvent. After coating or impregnating the winding with the impregnant and curing the resin, the silicone resin thus impregnated and cured is at least partially thermally decomposed by heating above about 300° C. in a separate heating step or by subjecting the impregnated winding to temperatures above about 300° C. in its working environment. By thus heating the impregnated and cured winding insulation at temperatures above about 300° C., organic radicals are removed from the silicone resin which is thus converted to polysiloxane which is then exposed to a fluoro-compound derived from the synthetic fluoro-mica contained in the impregnant (the fluoro-compound is believed to decrease the melting point of the polysiloxane). The fluoro-compound is vaporized from the synthetic fluoro-mica at the same temperature as that at which the silicone resin is thermally decomposed to provide on combining the silicone resin and the synthetic fluoro-mica a ceramiclike insulation for the winding, as more fully hereinafter described.

The impregnant of the invention is prepared by suspending small pieces of synthetic fluoro-mica having a length of not more than 4 $\mu$m with a diameter of 0.1 to 5 $\mu$m in a solution of organo-silicon compound, or silicone resin, in a weight ratio of not less than 1:1 with an organic solvent. The organic solvent may be one or more of xylene, butylcellosolve and/or cellosolve acetate or other suitable solvent for the silicone resin.

The canned motor pump according to the invention may further include a thermal insulation sealingly surrounding the whole periphery of the canned motor, the generated heat from which is absorbed in the treating fluid, thereby allowing the canned motor pump to be used as a pump for feeding the high temperature fluid and reducing the heat load for the heating source.

The invention will now be described in more detail by the non-limiting embodiments with reference to the accompanying drawings.

DETAILED DESCRIPTION OF THE INVENTION

Figure 1:
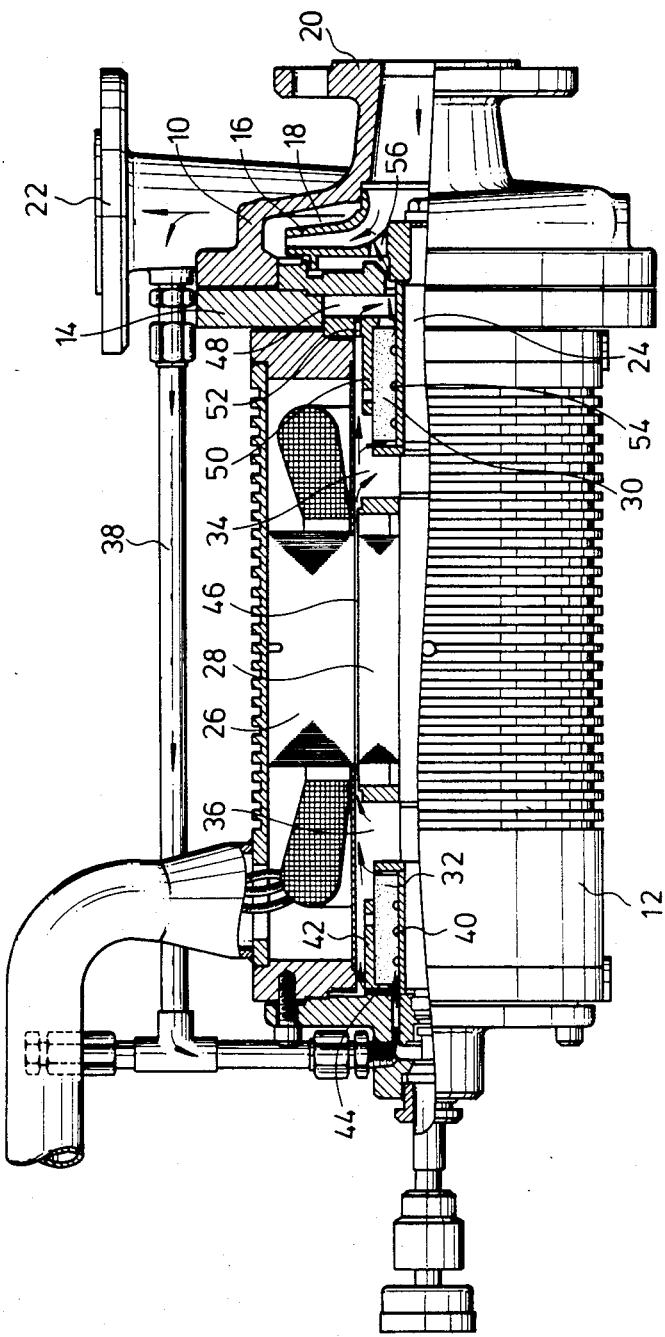
FIG. 1 is a sectional side view of a main portion of the canned motor pump for use at high temperature according to one embodiment of the invention.

In FIG. 1 there is illustrated the canned motor pump according to the invention for use with high temperature fluids and comprising a pump 10 and a canned motor 12, wherein the pump 10 and the motor 12 are interchangeably connected with an adapter.

The pump 10 is provided with a suction pipe 20 and a delivery pipe 22, each communicating with a pump chamber 18 having therein an impeller 16 which is secured to an extended end of a rotor shaft 24 for the motor 12. The motor 12 comprises a stator assembly 26 and a rotor assembly 28. The rotor shaft 24 is supported by front and rear bearings 30 and 32, respectively. At opposite end portions of the rotor assembly 28 are formed a front and rear rotor chamber 34 and 36, respectively. The rear rotor chamber 36 communicates with an external conduit 38 connected to the delivery pipe 22 of the pump 10. Thus, a portion of the treating fluid is introduced into the rear rotor chamber 36 from the delivery pipe 22 of the pump 10 and is passed through holes 40 provided on an inner circumference of a rear bearing 32 and through holes 44 provided in a bearing support 42 securing the rear bearing 32 in order to lubricate the latter and to absorb the generated heat from the motor. The treating fluid introduced into the rear rotor chamber 36 is transported to the front rotor chamber 34 through a gap 46 between the rotor and the stator.

The adapter 14 is provided with a flow path 48 for connecting the front rotor chamber 34 with the pump 10 on its low pressure side. In other words, the flow path 48 connects with the front rotor chamber 34 through holes 52 provided in a bearing support 50 securing a front bearing 30 and through holes 54 provided on an inner circumference of the front bearing 30 in order to introduce the treating fluid, which has completed the lubrication of the front bearing 30 and the absorption of the generated heat from the motor, into the flow path 48. The treating fluid introduced into the flow path 48 is then guided to the impeller 16 adjacent to its suction port side via a balance hole 56 which passes through the impeller 16 from its back side.

An important aspect of the invention, is the novel, improved insulation applied to the field winding of the instant canned motor in order to enhance its heat resistance and dielectric strength for use at high temperature, in contrast with the conventional canned motor. A copper wire employed as a winding conductor is plated with nickel and is additionally coated with a glass insulating coat for protection from thermal oxidation. Further, a laminated mica plate bonded with an inorganic material is used for a wedge, while laminated mica with a possibly least amount of a special silicone resin adhesive is utilized for a flexible insulating sheet. As an impregnating material for insulating the windings from each other and an embedding material for coil ends, there is used a suspension of synthetic fluorinated mica pieces together with an organic solvent in an organic silicone solvent. In this case, synthetic fluorinated mica pieces having a thickness below 5 nm and a diameter of 0.1 to 5 $\mu$m are used together with an organic solvent, such as a solvent mixture of xylene, butylcellosolve and cellosolve acetate, in a weight ratio of the mica to the solvent of 1:1 or more. The resulting suspension is then used to impregnate the winding, which is then cured.

If the field winding is insulated in this way, the impregnated insulation material will vaporize some fluorine compounds, such as $SiF_4$, KF and others, from the synthetic fluorinated mica which react with the siloxane derived from the organic silicone compound leading to ceramicization at temperatures of more than 200° C., thereby improving the mechanical strength and the dielectric strength of the winding. Thus, the canned motor will be provided with sufficient dielectric strength to endure the high temperature environment which may be 300° C. or more, thereby permitting the canned motor to be satisfactorily operated in the canned motor pump. This aspect of the invention is more fully hereinafter described.

In accordance with the embodiment of FIG. 1, the high temperature treating fluid discharged from the pump 10 has been cooled by the ambient atmosphere when introduced into the rear rotor chamber 36 of the canned motor through the external conduit 38. The cooled treating fluid absorbs the heat generated from the canned motor 12 upon flowing through it, substantially cooling it and lubricating the front and rear bearings 30, 32. The treating fluid, after absorbing the heat generated in the motor, is circulated into the pump 10 on its lower pressure side through the path 48 of the adapter 14.

As apparent from the foregoing, the canned motor pump of this embodiment may introduce a portion of the high temperature fluid into the canned motor under natural cooling and allow the generated heat of the motor to be absorbed by the treating fluid which is then circulated to the pump, thereby effectively utilizing the heat energy of the motor. Thus, pumping of the high temperature fluid, which has hitherto been considered difficult, may now conveniently and economically be achieved. For higher temperature treating fluids, the external conduit 38 is preferably provided with a cooling fin, if required.

Figure 2:
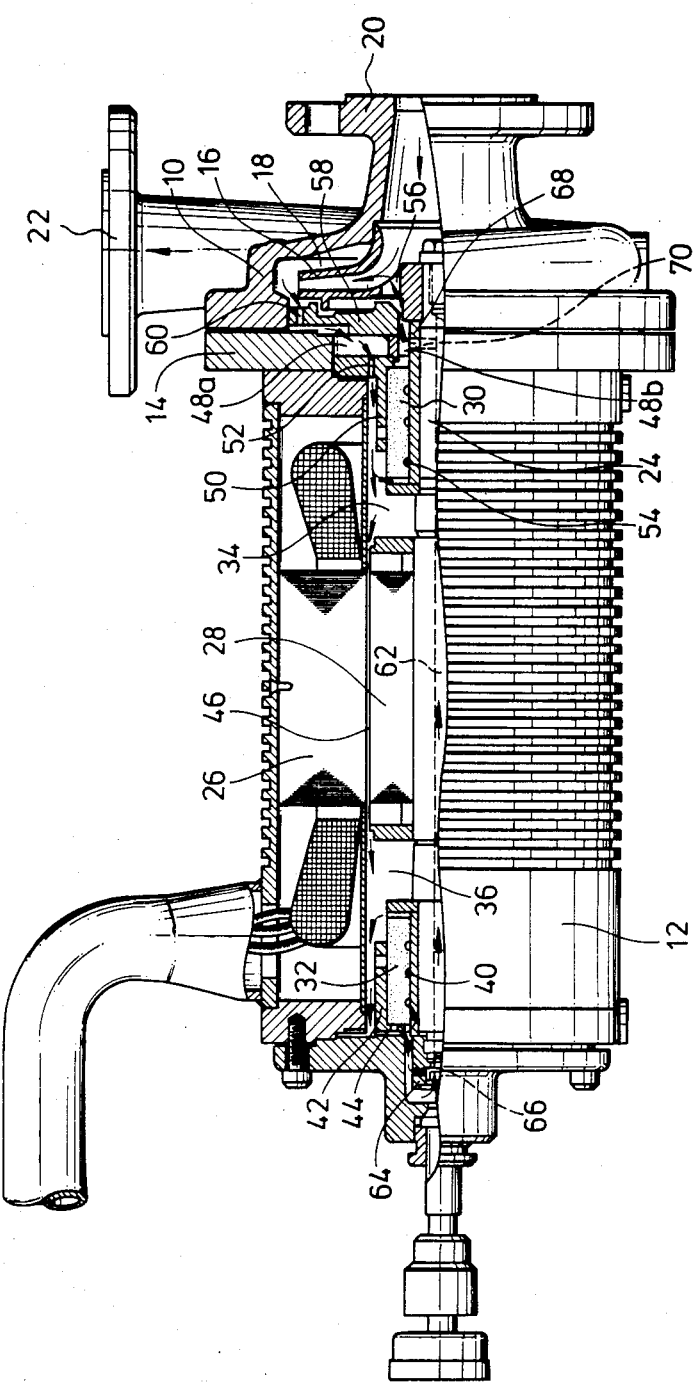
FIG. 2 is a sectional side view of a main portion of the canned motor pump according to another embodiment of the invention.

In FIG. 2 there is illustrated another embodiment of the canned motor pump, according to the invention, for use at high temperature. In this embodiment, a liner disc 58 arranged between the pump 10 and the adapter 14 at their joining site is extended at its rotor shaft 24 side, which is fitted with the bearing support 50 for dividing the path 48 of the adapter 14 into two portions (48a, 48b), one of which (48a) is connected with a hole 60 located in the periphery of the liner disc 58 opposite to the impeller 16.

In addition, an internal conduit 62 is formed axially through the rotor shaft 24 and communicates with the rear rotor chamber 36 via a hole 66 passed through an end nut 64 fitted to the rear end of the rotor shaft 24 on the one hand, while the internal conduit 62 is connected, on the other hand, with the other path portion 48b of the adapter 14 via a hole 70 passed through a spacer 68 provided at the front end of the rotor shaft 24. The path portion 48b is connected with the pump 10 on its low pressure side. The construction of this embodiment is identical to that of FIG. 1 except that an internal conduit is provided within the rotor shaft in lieu of the external conduit of the FIG. 1 embodiment. The detailed description, therefore, may be omitted for the same construction.

In the embodiment of the canned motor pump as shown in FIG. 2, a portion of the high temperature fluid sucked into the pump 10 is introduced into the front rotor chamber 34 through the hole 60, the path portion 48a and the hole 52 in that order. Then, a portion of the treating fluid introduced into the front rotor chamber 34 is returned to the pump 10 on its lower pressure side sequentially through the holes 54, the path portion 48b and the balance hole 56 of the impeller 16 in order to lubricate the front bearing 30. Most of the treating fluid introduced into the front rotor chamber 34, on the other hand, flows through the gap 46 between the rotor and the stator and is then guided to the rear rotor chamber 36 in order to absorb the generated heat of the motor for cooling. A portion of the treating fluid introduced into the rear rotor chamber 36 is circulated to the holes 40 for lubricating the rear bearing 32. Then, most of the treating fluid introduced into the rear rotor chamber 36 is circulated to the pump 10 on its lower pressure side sequentially through the hole 44 of the bearing support 42, the hole 66 of the end nut 64, the internal conduit 62 of the rotor shaft 24, the hole 70 of the spacer 68, the path 48b and the balance hole 56 of the impeller 16. Thus, the embodiment of FIG. 2 has the advantages that heat dissipation from the high temperature fluid may be prevented, effective heat absorption or cooling may be achieved and the construction has the advantage that unlike the FIG. 1 embodiment an external conduit is not required enabling this construction to be used for treating fluids at temperature ranges below those herein disclosed.

Figure 3:
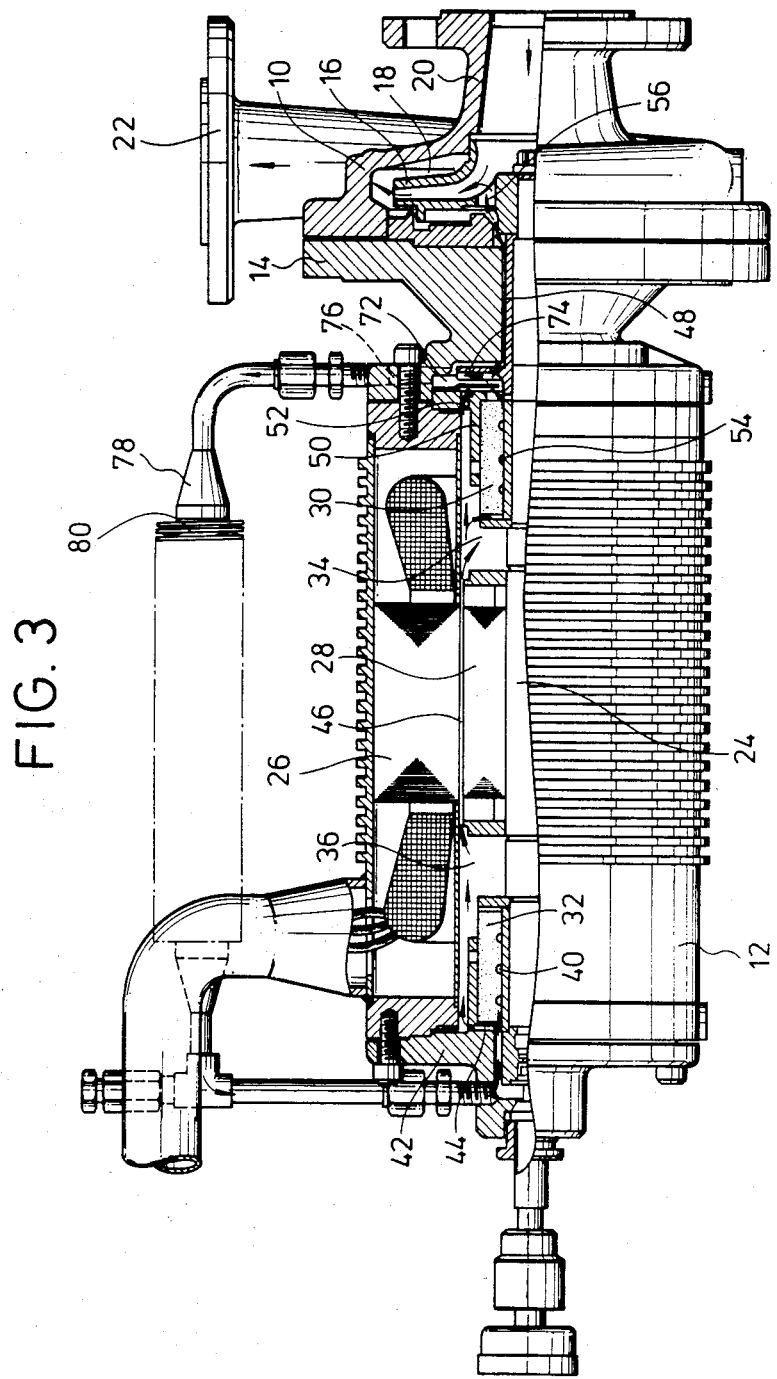
FIG. 3 is a sectional side view of a main portion of the canned motor pump according to a further embodiment of the invention.

In FIG. 3 there is illustrated a further embodiment of the canned motor pump according to the invention for use at high temperature, wherein an auxiliary pump chamber 72 is defined between the front rotor chamber 34 and the adapter 14 at their joining site. Within the auxiliary pump chamber 72 is arranged an auxiliary impeller 74, which is secured to the rotor shaft 24. The adapter 14 is provided with the path 48, as in the embodiment shown in FIG. 1, one end of which is connected to the back side of the impeller 16 in the pump chamber 18 and the other end is connected to the back side of the auxiliary impeller 74 in the auxiliary pump chamber 72. Further, a part of the adapter 14 is provided with a path 76 connected on the one hand to the auxiliary pump chamber 72 on its delivery side and on the other hand to an external conduit 78 communicating with the rear rotor chamber 36. The external conduit 78 may be provided with cooling fins 80, if desired. Otherwise the construction of this embodiment is identical to that of FIG. 1. The detailed description, therefore, may be omitted for the same construction.

In accordance with the canned motor pump as shown in FIG. 3, a portion of the high temperature fluid to be treated is introduced into the auxiliary pump chamber 72 via the path 48 from the back side of the impeller 16 and is then guided to the rear rotor chamber 36 through the external conduit 78 under action of the auxiliary impeller 74, wherein the high temperature fluid is cooled by the ambient atmosphere in the external conduit 78. The treating fluid thus cooled absorbs the heat generated from the motor, upon flowing through the canned motor 12, and lubricates the front and rear bearings. The treating fluid introduced into the front rotor chamber 34 from the rear rotor chamber through gap 46 is then forcibly circulated to the external conduit 78 under action of the auxiliary impeller 74, thereby circulating the treating fluid through the motor. With the canned motor pump of FIG. 3, a deficient or excess amount of the treating fluid circulated through the canned motor 12 may be adjusted by the treating fluid of the pump 10 through the path 48 of the adapter 14. Therefore, a portion of the high temperature fluid may be circulated through the canned motor under natural cooling, as in the embodiment of FIG. 1, thereby absorbing all of the generated heat of the motor. Thus, the pumping of the high temperature fluid may be conveniently and economically effected.

As previously noted, it is an important aspect of this invention to provide a stator winding insulation which will withstand the severe temperature environment in which the instant canned motor must function. This requires strengthening of the thermal resistance and electrical and dielectrical properties of the insulation used in the motor windings. How this is achieved will now be explained with reference to FIGS. 4 to 8.

Figure 4:
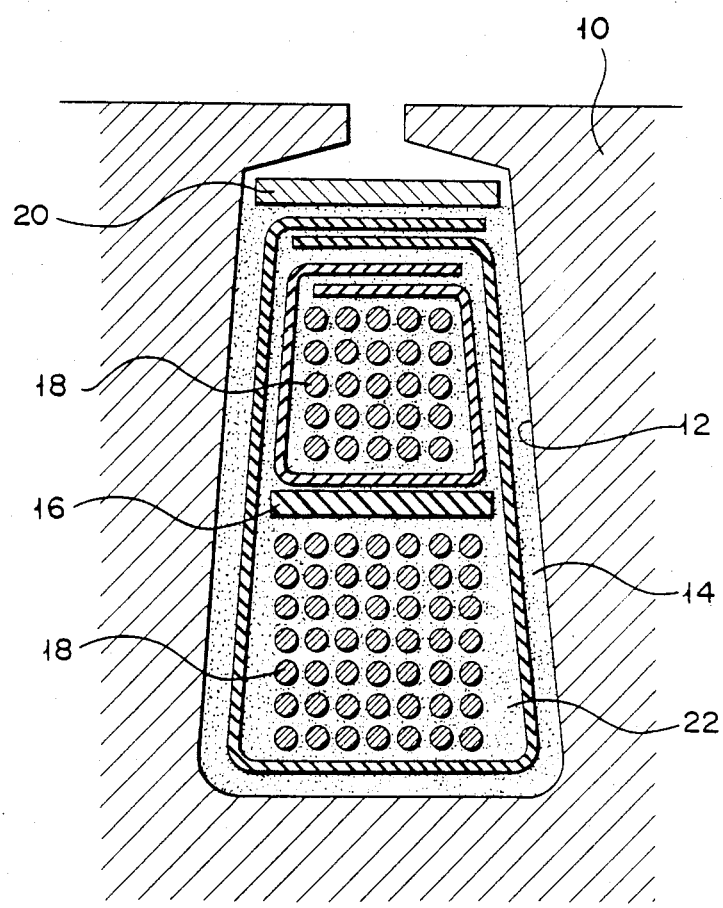
FIG. 4 shows a sectional side view of an insulation of a coil for electric apparatus according to the present invention.

In FIG. 4, an insulation of a coil for the canned motor is shown for use in an iron core 10. A slot 12 is formed in the iron core 10. An insulating sheet for earth (ground) of a double sided mica paper 14 is circumferentially placed in the slot 12. An interphase insulating sheet of a laminated mica plate 16 is placed between conductive coils, 18. A wedge member 20 is placed as a covering and support for the elements. The coil is preferably made of copper wire, the surface of which is coated with nickel for protection against thermal oxidation.

An impregnant 22 for the coils 18 may be prepared by suspending small pieces of synthetic fluoro-mica having a length of not more than 5 μm with a diameter of 0.1 to 5 μm in a solution of an organo-silicon compound, or silicone resin, in a weight ratio of not less than 1:1 of the solvent to the solid material used.

The term "organo-silicon compound" for purposes of this description is synonymous with the term "silicone resin". In a publication entitled "Silicones in Protective Coatings" by Lawrence H. Brown and published by Dow Corning Corporation, Midland, Mich., a complete detailed dissertation is given on the exact chemical composition of such silicone resins. The silicone materials disclosed in the cited publication which decompose at temperatures above about 300° C. and which have their melting temperatures reduced by the fluoro-compound vaporized from the synthetic fluoro-mica may be used for purpose of this invention.

A suspension of the silicone resin and the synthetic fluoro-mica is mixed with an organic solvent which may comprise one or more of xylene, butylcellosolve and/or cellosolve acetate to obtain the impregnant. Thereafter, the coil is impregnated or coated with the impregnant, preferably in a bath of the impregnant, and then cured. After the impregnation and curing, the resulting coil may separately be preheated to not lower than 300° C. or used in its normal environment at temperatures not lower than 300° C., for example in the canned electric motor, thereby to allow organic radicals to be removed from the silicone resin for conversion of the latter to polysiloxane, which is then subjected to the fluoro-compounds such as $SiF_4$, $KF$ and the like, vaporized from the synthetic fluoro-mica at the same temperature as that at which thermal decomposition of the silicone resin occurs thereby to reduce the melting point of the polysiloxane for reaction with residual synthetic fluoro-mica to form the desired ceramic-like insulation. Thus, during actual use of the coil in the canned motor or on preheating the coil at an elevated temperature not lower than 300° C., a ceramic formation is obtained. As described herein, the term "ceramic formation" signifies the formation of a substance having ceramic type properties, such as high heat resistance, insulating properties and mechanical strength, through a fusing action or reaction between a component of the synthetic fluoro-mica and the siloxane derived from the silicone resin, or organo-silicon compound. In lieu of immersion, the impregnant can be applied as a coating to the coil by spraying or other suitable means.

Figure 5:
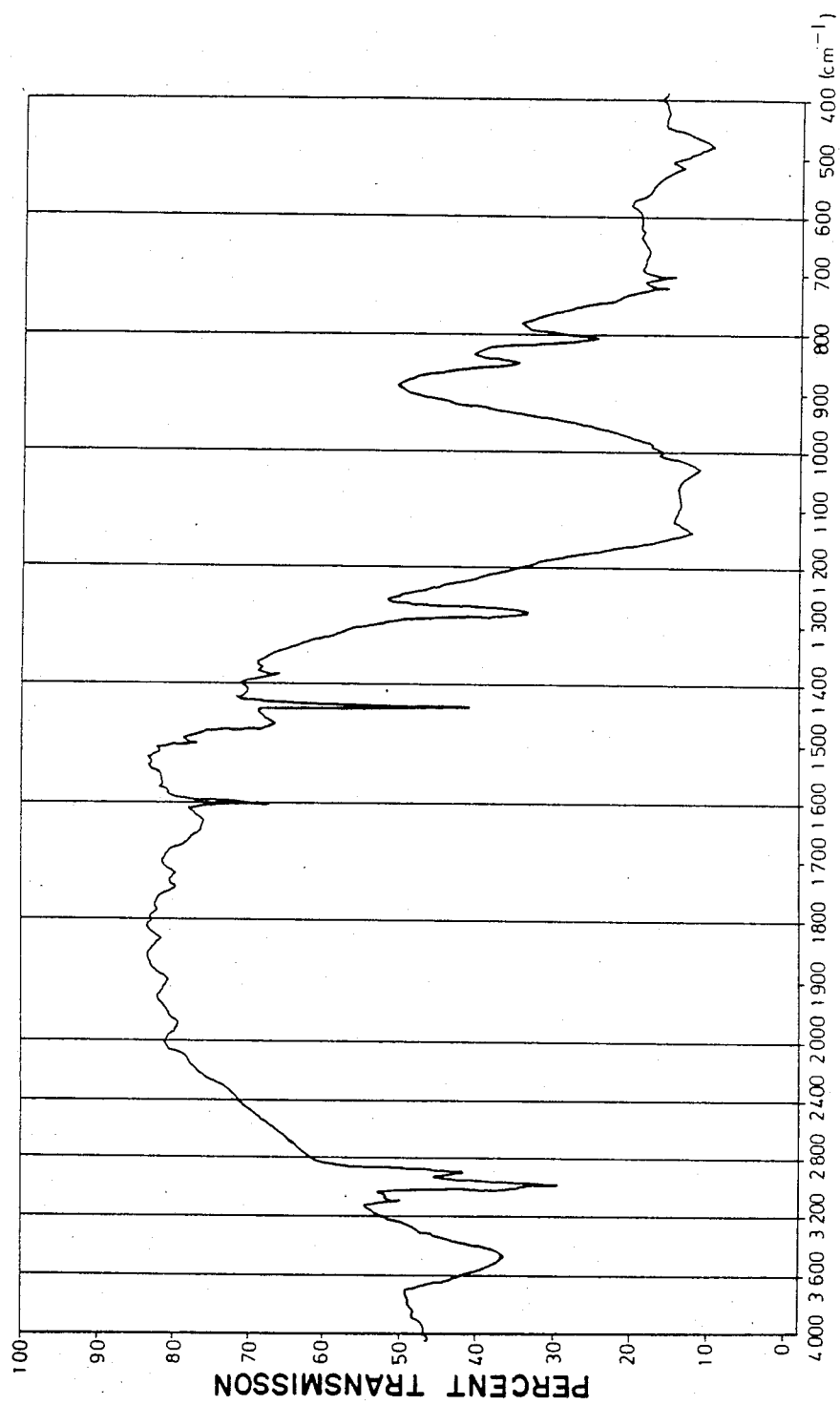
FIG. 5 is an infrared absorption diagram of a cured polymethylphenyl silicone resin (KR-282) suitable for use in the invention.

A polymethylphenyl silicone resin (KR282 sold by Shinetsu Chemical Co.) has been found to be effective in practicing the invention, but other silicones such as polymethyl silicones and polyphenyl silicones can be used with the proviso that the silicone resin used be at least partially dissociatable at temperatures above about 300° C., evidenced by loss of organic radicals from the silicone resin, and conversion thereof to polysiloxane. The dissociation of the resin is evidenced, as indicated, by weight loss or may be determined by other analytical methods such as by an infra-red absorption spectrum of the silicone material. FIG. 5, for example, shows the infra-red absorption spectrum for a cured polymethylphenol silicone resin (KR-282) cured at 200° C. for 15 hours and having the following basic structure:

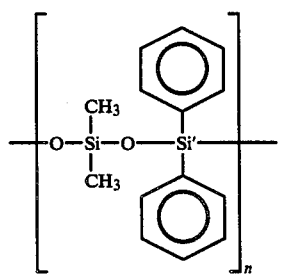

FIG. 5 is an infra-red absorption pattern for methlyphenyl silicone showing characteristic absorptions at 1435 cm$^{-1}$ attributable to phenyl silicon, at 1266 cm$^{-1}$ attributable to methyl silicon linkages and at 1000–1150 cm$^{-1}$ attributable to oxygen silicon linkages. The absorption diagram of FIG. 5 confirms the above chemical structure of the polymethylphenyl silicone resin.

Figure 6:
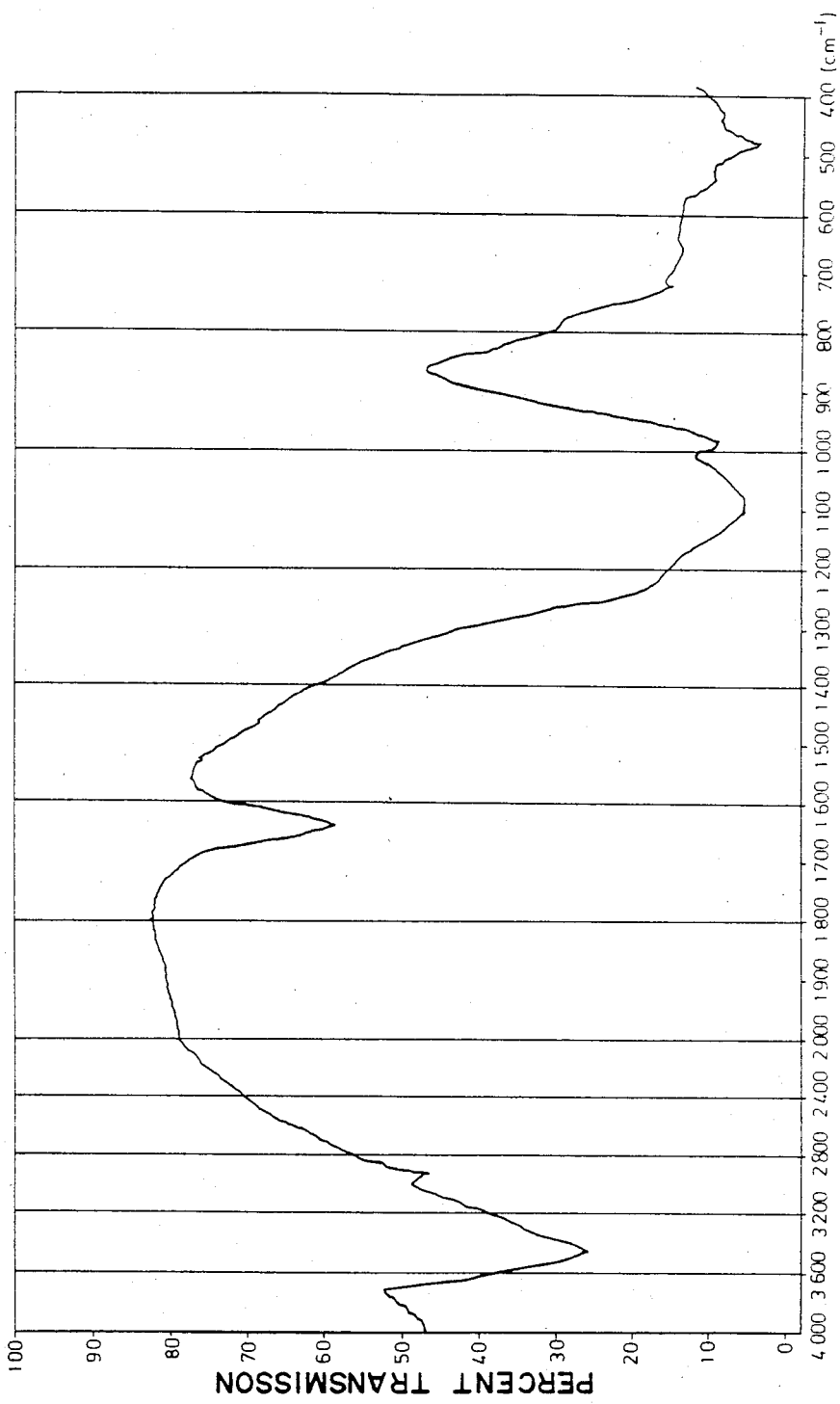
FIG. 6 is an infrared absorption diagram for the silicone resin of FIG. 2 obtained after the resin has been heated at 400° C. for 1000 hours.

FIG. 6 is an infra-red absorption diagram of the same polymethylphenyl silicone resin as in FIG. 5 obtained after heating the resin at about 400° C. for 1000 hours. It will be noted from FIG. 6 that the absorption patterns of 1266 cm$^{-1}$ and 1435 cm$^{-1}$ are not observed, thus substantiating that the silicone resin has substantially lost its methyl and phenyl radicals and has converted to a polysiloxane. Stated differently, the organic radicals are thermally dissociated from the resin leaving the silicon oxygen backbone of the resin as a polysiloxane. After commencement of thermal dissociation of the silicone resin above about 300° C., the thermal dissociation progressively increases with increasing temperature and time, until the silicone resin is virtually completely dissociated.

Figure 7:
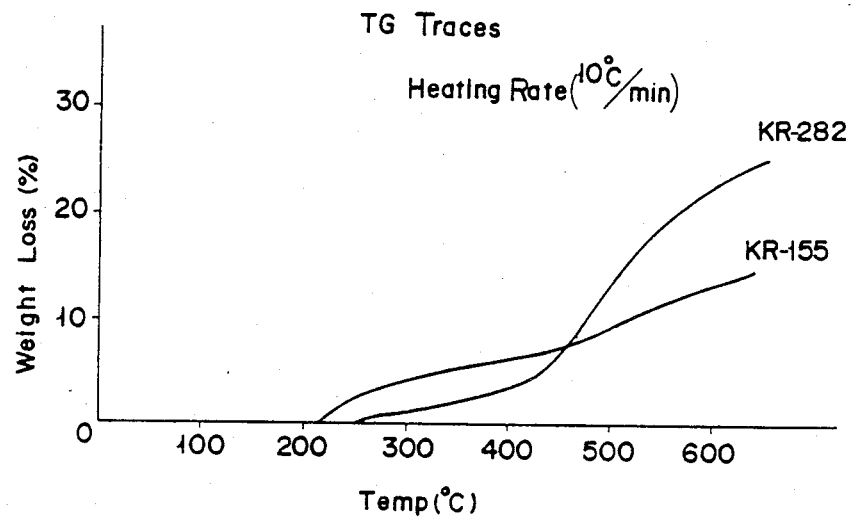
FIG. 7 is a plot of the weight loss of two silicone resins experienced when subjected to progressive high temperature heating.

FIG. 7 is a plot of the weight loss of two silicone resins with increasing temperature. The weight loss as already noted is due to thermal dissociation of the organic radicals of the resin leaving the siloxane backbone of the resin. In FIG. 7, the heating rate is 10° C./min. The curve identified as KR 282 is for the polymethylphenyl silicone resin for which the infra-red absorption pattern is shown in FIG. 5, while the curve identified as KR-155 is for another commercially available silicone resin.

Figure 8:
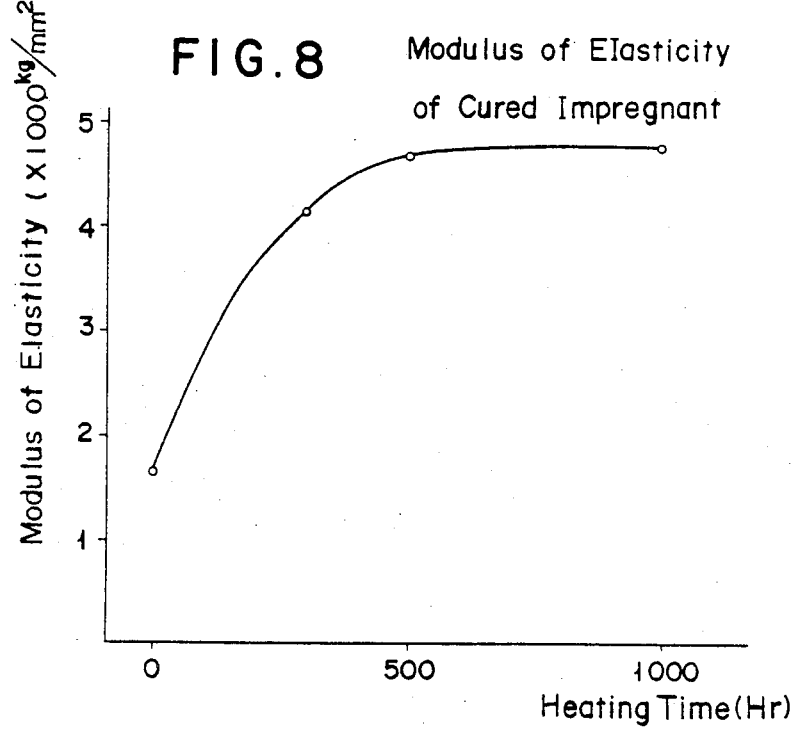
FIG. 8 is a plot of the modulus of elasticity of the coil impregnant of the invention after heating at about 400° C. at from 0 to 1000 hours.

Silicone resins are known to become brittle when they los their organic radicals during thermal decomposition. Surprisingly, applicants have determined that if the silicone resin is admixed, for example, with a synthetic fluoro-mica commonly available as PDM KM 325 from Topy Industries Ltd., and heated above 300° C., the silicone resin, instead of being brittle, will be converted into a hard ceramic-like material having an increased modulus of elasticity. This is illustrated in FIG. 8 in which the modulus of elasticity of a mixture of silicone resin with a synthetic fluoro-mica (PDM KM 325), containing about 20% of devitrified mica glass, is plotted against heating time, in hours, at 400° C. The mixture of silicone resin and synthetic fluoro-mica, containing about 20% of devitrified mica glass, prior to heating at about 400° C. was cured at 200° C. for 15 hours. No change in the usual properties normally obtained on curing were observed. In other words, no change in the usual modulus of elasticity was noted after the normal curing of the impregnant at 200° C. for about 2 to 15 hours or more. However, when the resin mixture was further heated, after curing, at about 400° C.; i.e. within the thermal decomposition range, the modulus of elasticity, which begins at a value between 1 and 2, rapidly increased to a value between 4 and 5 ($\times 100$ Kg/$\mu$m$^2$).

While the exact mechanism by virtue of which the improved ceramic-like insulation for a coil is obtained is not presently known, and applicants do not wish to be held to any theory for the action which may take place, it is presently believed that the synthetic fluoro-mica, such as a potassium tetra silicon mica [KMg$_{2.5}$(Si$_4$O$_{10}$)F$_2$], when subjected to the same temperatures which cause the silicone resin to thermally dissociate, releases fluoro compound or compounds such as SiF$_4$ and KF in vaporized form which modifies the properties of polysiloxane by reducing its melting point, thereby facilitating reaction of the modified siloxane with residual synthetic fluoro-mica. This theory is predicated on our finding that the ceramic-like material of the invention is not formed at elevated temperatures above about 300° C. when only the usual filler materials are present such as TiO$_2$, Al$_2$O$_3$, Fe$_2$O$_3$ or ZnO (frequently used for heat resistant paints) in the impregnant. Hence, we have concluded the filler does not enter into a reaction with or bind the polysiloxane. In fact, in the absence of the synthetic fluoro-mica only a brittle siloxane material with a decreased modulus of elasticity is formed. However, the inclusion in the impregnant of the synthetic fluoro-mica, advantageously containing vitreous material, leads to the ceramic-like material formation for insulating the coil. We have also determined that a ceramic-like coil insulating material will not be formed at elevated temperatures above about 300° C. if a mica other than a synthetic fluoro-mica is used in the coil impregnant. By including in the impregnant the silicone resins herein contemplated, such as KR-282, together with a synthetica fluoro-mica such as PDM KM 325 we obtain a ceramic-like insulation which has a high modulus of elasticity and thus not brittle as is the case for normally cured silicone resin when used as insulation, and considerably tougher. For example, when a solvated polymethylphenyl silicone resin was mixed with calcined powder of natural mica and a film of the material cured at 200° C. for between 2 to 15 hours than heated at 400° C. for 1000 hours, the resulting film could be scraped from an underlying surface with the lead of a sharpened pencil having a hardness of 1 H (JIS—Japanese Industrial Standard). On the other hand, if a solvated polymethylphenyl silicone resin is mixed with synthetic fluoro-mica, formed as a film, cured subsequently heated at the same temperatures and time, the resulting film cannot be scraped or scratched from the underlying surface with the lead of a sharpened pencil having a hardness of 7 H (JIS on the same scale).

In one embodiment of an insulation for a coil for a 2.2 KW motor having an iron core 10 formed with the slots 12, there are inserted the insulating sheet for earth 14, and the wedge member 20 which are preheated at 120° C. to remove the moisture of each material. Thereafter, the iron core is cooled between about 400–50° C. and is then immersed for about 10 minutes in the solution of silicone resin containing the suspended synthetic fluoro-mica. The impregnated coil is then dried in air for about one hour and thereafter heat-dried at about 80° C. for two hours. The coil may then be heated at about 120° C. for two hours or more to remove the solvent from the impregnant. The impregnated coil is then heated at about 200° C. for between 2 to 15 hours or more to cure the impregnant. The impregnated and cured coil thus-treated is then subjected to further heating at not less than 300° C. and preferably at about 400° C. for a time sufficient to thermally dissociate the silicone resin and for vaporization of the fluoro-compound for reducing the melting temperature of the siloxane thus obtained. The further heating may be performed separately or during operation of the motor, which provides the necessary elevated temperature environment of not lower than 300° C., to convert the impregnant to a ceramic-like material.

The following table compares the insulated coil of the invention with an insulated coil impregnated with TEFLON R material. The table demonstrates that exposure of a heat-resistant coil insulated with TEFLON and heated to about 400° C. for about 1300 hours reduces greatly the dielectric strength of the TEFLON insulation with loss of the function of the apparatus, whereas no reduction of the dielectric strength may be seen in the insulated coil according to the invention even after being exposed to about 400° C. for 1400 hours.

|  | Invented Coil | | Insulated Coil with TEFLON Material (Unit: KV) | |
| --- | --- | --- | --- | --- |
|  | Initial | After use at 400° C. for 1400 hours | Initial | After use at 400° C. for 1300 hours |
| Dielectric Strength between phases | 3.95 | 3.92 | 3.45 | 1.04 |
| Dielectric Strength for earth sheet | 3.80 | 4.32 | 4.80 | 0.90 |

SPECIFIC EXAMPLES (1) Preparation of an impregnating agent

The Impregnating agent was prepared by suspending synthetic fluoro-mica and pigment in a silicone resin containing an organic solvent as follows:

The synthetic fluoro-mica used herein may be prepared by melting a composition in a molar ratio of $0.5K_2O : 1.5MgO : 1.1MgF_2 : 4SiO_2$ at 1400° C. and cooling the resulting melt to approximately 1000° over a period of 20 minutes and then to room temperature to form a sintered mass containing about 80% of fluorotetrasilic mica crystal, or crystalline potassium tetra silicon mica, $[KMg_{2.5}(Si_4O_{10})F_2]$ and about 20% of vitreous matter, which mass in turn is pulverized and then sieved through 350 mesh screen to obtain finely divided synthetic fluoro-mica powder. (The above synthetic fluoro-mica is commercially available as FDM KM325 from Topy Industries Limited).

The impregnating agent is then prepared by kneading in a ball mill for 3 hours a formulation consisting of 100 parts of a composition containing, by weight, 58% of the said synthetic fluoro-mica powder, 32% of silicone resin (calculated as solid matter) [commercially available as KR-282 from Shinetsu Chemical Co., Ltd.], 6% of titanium dioxide [commercially available from Hayashi Pure Chemicals Co., Tld., $TiO_2$] and 4% of aluminium oxide [commercially available under FA-6 from Showa Denko K.K.] in admixture with 300 parts of a mixed solvent consisting of, by weight, 50% xylene, 17% of butyl cellosolve and 33% of cellosolve acetate.

(2) Insulating treatment:

For a motor coil of 2.2 KW, two sheets of mica paper of 0.19 mm thickness (commercially available under the trade name of Mica DG78-C from Okabe Mica Industries) with an earth-insulating sheet 14 and interphase-insulating sheet 16, as well as one sheet of mica paper 1.0 mm thickness (commercially available under the trade name of Mica D-581 from Okabe Mica Industries) with a Ni-plated copper conductor double glassfiber winding 18 of 0.85 mm diameter (supplied from the Furukawa Electric Co., Ltd.) and a wedge member 20 were inserted into a slot 12 to form an iron core 10. The iron core thus formed was heated at a temperature of 120° C. for four hours to eliminate moisture in the materials. Then, the iron core was cooled to 40°-50° C. and dipped in a bath containing the impregnating agent described hereinabove for ten minutes. Thereafter, the iron core was removed from the impregnating bath and left at the ambient temperature in the atmosphere for natural drying. Then, the iron core was heated at 80° C. for two hours, then at 120° C. for two hours to eliminate the organic solvent. Thereafter, heatcuring was carried out at 200° C. for two hours to obtain an insulation of the motor coil.

The insulation of the motor coil thus formed has an interphase dielectric strength of 3.92 KV and an earth-insulating strength of 4.32 KV even after exposure at the temperature of 400° C. for 1400 hours, whereas the initial interphase dielectric strength and the initial earth-insulating strength are in the order of 3.95 KV and 3.8 KV, respectively, which indicates that the motor coil thus treated maintains its dielectric strength even over long periods of use.

As described hereinbefore, the coil is impregnated in accordance with the invention with an impregnating agent comprising a suspension in an organic solvent for the organosilicon compound, or silicone resin, of the silicone resin and the synthetic fluoro-mica which impregnating agent after application as an insulant, as described, is heated to remove the organic solvent and then cured at the high temperatures attained in a rotary electric apparatus, such as an electric motor, or upon heating to such high temperatures, i.e. above about 300° C., the fluoro-compound is vaporized from the sythetic fluoro-mica and modifies the properties believed to reduce the melt temperature of the siloxane derived from the organo-silicon compound which then reacts with residual synthetic fluoro-mica to provide the ceramic-like insulation of the invention having improved mechanical and dielectric strength and freedom from thermal degradation at high temperature usage. Especially in the use of insulation for a coil used in a motor, the impregnation within the slot is ensured, prior to elevated temperature heating, due to the small particle size of the synthetic fluoro-mica so that any failure or damage of the insulated coil through vibration or impact may be avoided.

The following table provides the supplier's data applicable to the KR282 silicone resin which may be used in the impregnant of the invention.

| Type | | KR-282 |
| --- | --- | --- |
| Appearance | liquid film | pale yellow, transparent smooth surface |
| Non-volatile content (%) | | 50.2 |
| Solvent | | xylene |
| Viscosity (P. 25° C.) | | 1.0–2.0 |
| Acid value (based on non-volatile content) | | $\leqq 3.0$ |
| Specific gravity, 25° C. | | 1.00–0.02 |
| Deposition (mm) | Center portion | $\geqq 0.03$ |
| | Lower portion | lower than 130% of center portion |
| Drying time (hr./°C.) | | within 1 hr./200° C. |
| Volume resistivity ($\Omega$-cm) | Ordinary | $> 10^{14(?)}$ |
| | 180° C. | $> 10^{12(?)}$ |
| | Hot water | $> 10^{14(?)}$ |
| Breakdown strength (KV/0.1 mm) | Ordinary | $> 7.5$ |
| | 180° C. | $> 6.5$ |
| | Hot water | $> 7.0$ |
| Bending-resistance (250° C., 3 mm$\phi$) | | $> 12$ hrs. |
| Heat loss (%), (250° C., 72 hrs.) | | $< 7$ |
| Drying condition for a testing piece | | 280° C./hr. |

As apparent from the various embodiments described hereinbefore, the canned motor pump according to the invention, when used for treating the high temperature fluid of more than 200° C., permits the canned motor to be operated with sufficient dielectric strength and also to be cooled and lubricated under natural cooling of the high temperature fluid, thereby providing an excellent and economical canned motor pump which helps to conserve natural resource and energy.

In addition, the canned motor pump according to the invention, owing to the improved dielectric strength of the canned motor, may employ the treating fluid at relatively high temperature to absorb the generated heat from the motor for cooling, thereby allowing the heat load of the heating source (for example, a fuel cost for a boiler or a heater) to be reduced in a plant for the high temperature liquid.

Figure 9:
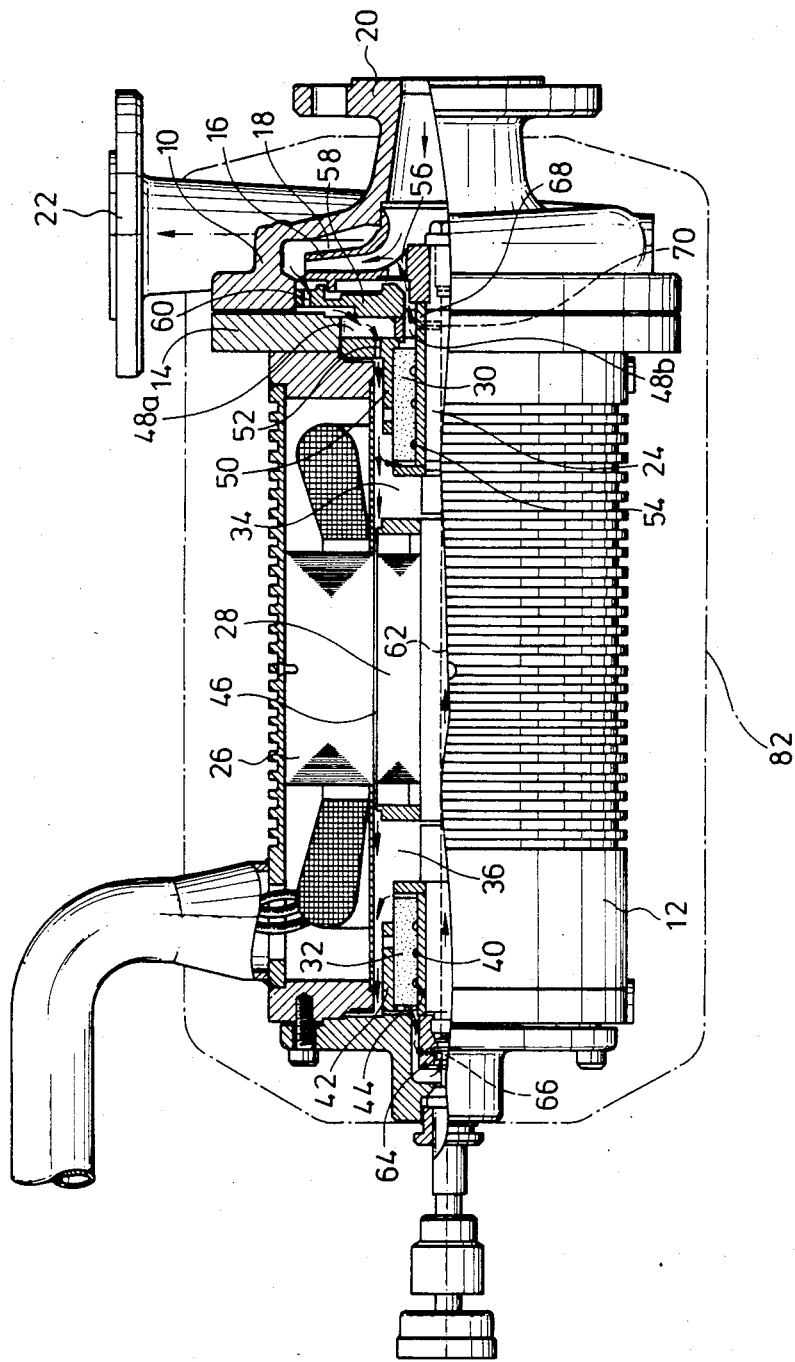
FIG. 9 is a sectional side view of a main portion of the canned motor pump according to a still further embodiment of the invention.

As shown in FIG. 9, for example, the whole circumference of the canned motor 12 as well as portions of the pump 10 and of the adapter 14 connected to the canned motor 12 are closely surrounded by a thermal insulating material 82, which may completely prevent the generated heat of the canned motor 12 from being dissipated. Thus, all of the generated heat may be absorbed, as in the embodiment shown in FIG. 2, into the treating fluid circulating through the canned motor 12. In this way, the canned motor pump as shown in FIG. 9, if employed as a feeding pump in the manufacturing plant for the high temperature fluid, permits all of the generated heat of the motor to be absorbed in the treating fluid, thereby reducing the energy loss and alleviating the heat load of the heating source (for example, the fuel cost for the boiler or the heater).

This invention has been described hereinabove by its preferred embodiments but it should be understood that various modifications may be made without departing from the scope and spirit of the invention.

We claim:

1. A canned motor pump for use with high temperature process fluids having temperatures above 200° C., comprising a canned motor having a rotor assembly including a rotor shaft to which an impeller is secured, said impeller extending into a chamber of the pump having a suction side and a discharge side, spaced apart rotor chambers at opposite ends of said rotor assembly, said rotor chambers comprising a front rotor chamber and a rear rotor chamber, and means forming part of the pump defining a fluid circulating path for circulating a portion of the fluid in the pump into and through the rotor chambers forming part of said fluid circulating path, one of said rotor chambers communicating with said suction side of the pump and another of said rotor chambers communicating with the discharge side of the pump whereby said portion of the fluid flowing into and through the rotor chambers effectively cools the canned motor, and to resist breakdown of the canned motor when subjected to operating current and high temperature fluids, said canned motor has field windings impregnated with a ceramic-like insulating material which is the reaction product of an impregnant comprising a suspension of a silicone resin and a synthetic fluoro-mica in an organic solvent, said reaction product being derived on subjecting the impregnant, after curing, to temperatures above 300° C. to thermally decompose the silicone resin, evidenced by loss of organic radicals from the silicone resin with resulting conversion of the resin to polysiloxane which is exposed to a fluoro-compound vaporized from said synthetic fluoro-mica at the same temperature as that at which decomposition of the silicone resin occurs.

2. The canned motor pump according to claim 1, wherein the synthetic fluoro-mica contains devitrified mica glass.

3. The canned motor pump according to claim 2, wherein the silicone resin comprises a polyphenylmethyl silicone.

4. The canned motor pump according to claim 3, wherein the silicone resin is KR-282 and the synthetic fluoro-mica is PDM KM 325.

5. The canned motor pump according to claim 3, wherein said polyphenylmethyl silicone has the following basic structure

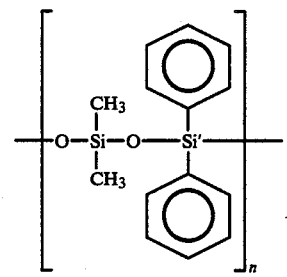

6. The canned motor pump of claim 1, wherein the reaction product of polysiloxane and synthetic fluoro-mica has a dielectric strength against ground of at least 4.32 and between phases of 3.92 and a modulus of elasticity of between 4 and 5 thousand Kg/$\mu$m.

7. The canned motor pump according to claim 1, wherein the pump and the canned motor are interconnected by an adapter formed with a passage for interconnecting canned motor passages with pump passages.

8. The canned motor pump of claim 7, wherein said canned motor includes a stator, said front rotor chamber communicating via said adapter with a peripheral portion of the impeller at a discharge side of the pump; and the rear rotor chamber communicates with the front rotor chamber via a gap between said rotor and stator, said rear rotor chamber also communicating with the suction side of the pump via an internal conduit formed in the rotor shaft.

9. The canned motor pump of claim 8, wherein a liner disc having an opening is arranged between said suction side of the pump and said adapter and forming an extension dividing said adapter passage into two parts, one communicating with said opening in the liner disc and the other part with that end of the internal conduit nearest said front rotor chamber.

10. The canned motor pump of claim 1, wherein the fluid circulating path includes an external conduit connected at one end thereof with the discharge side of the pump, an opposite end of the external conduit communicating with the rear rotor chamber, said front rotor chamber in addition to communicating with said rear rotor chamber through said gap also communicating with said pump chamber on a back side of said impeller.

11. The canned motor pump of claim 1, wherein the fluid circulatory system includes an auxiliary pump chamber disposed between said chamber into which said impeller extends and said front rotor chamber and communicating with said chamber into which said impeller extends on a back side of said impeller, said auxiliary pump chamber also communicating at its delivery side with the rear rotor chamber via an external conduit and having a suction side communicating with said front rotor chamber.

12. The canned motor pump according to claim 1, wherein the field windings of the motor comprise a nickel-plated copper wire coated with a glass insulating material, a wedge of laminated mica bonded with an inorganic material, a flexible insulating sheet of laminated mica, silicone resin adhesive and an insulating impregnating material comprising a silicone resin filled with synthetic fluorinated mica.

13. The canned motor pump according to claim 1, further comprising thermal insulation surrounding the periphery of said canned motor.

* * * * *